United States Patent [19]

Picozza et al.

[11] Patent Number: 5,337,910

[45] Date of Patent: Aug. 16, 1994

[54] FOOD PROCESSING CONTAINER

[75] Inventors: Augusto A. Picozza, Orlando, Fla.; Takeshi Fukuda, Osaka, Japan

[73] Assignee: Dart Industries Inc., Deerfield, Ill.

[21] Appl. No.: 983,932

[22] Filed: Dec. 1, 1992

[51] Int. Cl.⁵ .................. B65D 25/28; B65D 81/20
[52] U.S. Cl. ................... 220/203; 220/208; 220/209; 220/756; 220/769; 220/760; 220/DIG. 19; 220/322
[58] Field of Search ............. 220/322, 201, DIG. 19, 220/203, 208, 209, 231, 756, 769, 760

[56]  References Cited

U.S. PATENT DOCUMENTS

| | | |
|---|---|---|
| D. 243,914 | 4/1977 | Marubashi et al. . |
| D. 253,331 | 11/1979 | Olschewski . |
| D. 257,930 | 1/1981 | Conti . |
| D. 277,632 | 2/1985 | Staufenberg . |
| D. 302,774 | 8/1989 | Murphy . |
| 1,240,689 | 9/1917 | Durning . |
| 1,384,851 | 7/1921 | Richardson . |
| 2,296,848 | 9/1942 | Gueffroy . |
| 2,307,043 | 1/1943 | Hothersall . |
| 2,983,402 | 5/1961 | Gottsegen . |
| 3,057,508 | 10/1962 | Kimbrough, Jr. . |
| 3,717,276 | 2/1973 | Luczak et al. ............... 220/231 |
| 4,149,650 | 4/1979 | Whelchel et al. ........... 220/231 |
| 4,349,118 | 9/1982 | Sanderson et al. .......... 220/201 |
| 4,548,824 | 10/1985 | Mitchell et al. . |
| 4,592,482 | 6/1986 | Seager . |
| 4,982,863 | 1/1991 | Skillius . |
| 4,989,744 | 2/1991 | Tominaga . |
| 5,044,513 | 9/1991 | Van Berne . |

Primary Examiner—Joseph Man-Fu Moy
Attorney, Agent, or Firm—John A. Doninger

[57] ABSTRACT

A container for food processing including an upwardly opening receptacle with a cover selectively sealed thereto and retained by pivotally mounted handles including outer retention bars which downwardly engage against the cover and include depending clips which lock beneath lugs on the receptacle. The cover includes a pressure responsive central domed portion and a selectively openable venting port.

15 Claims, 5 Drawing Sheets

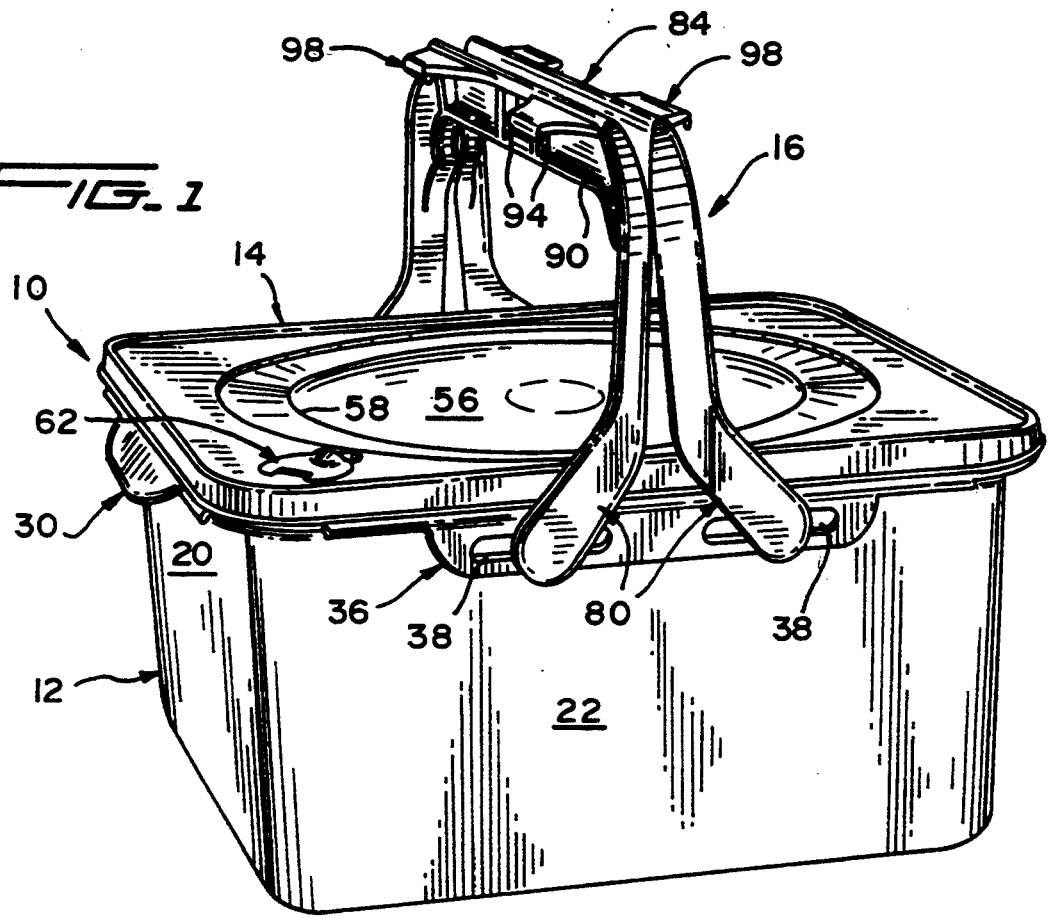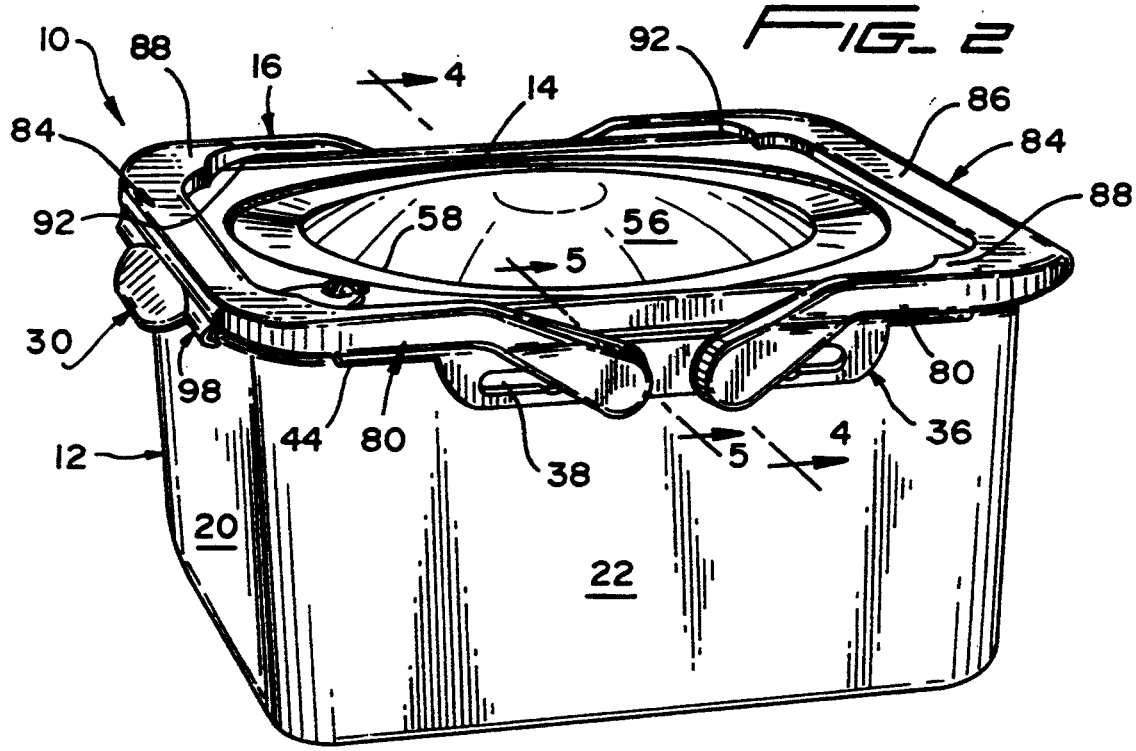

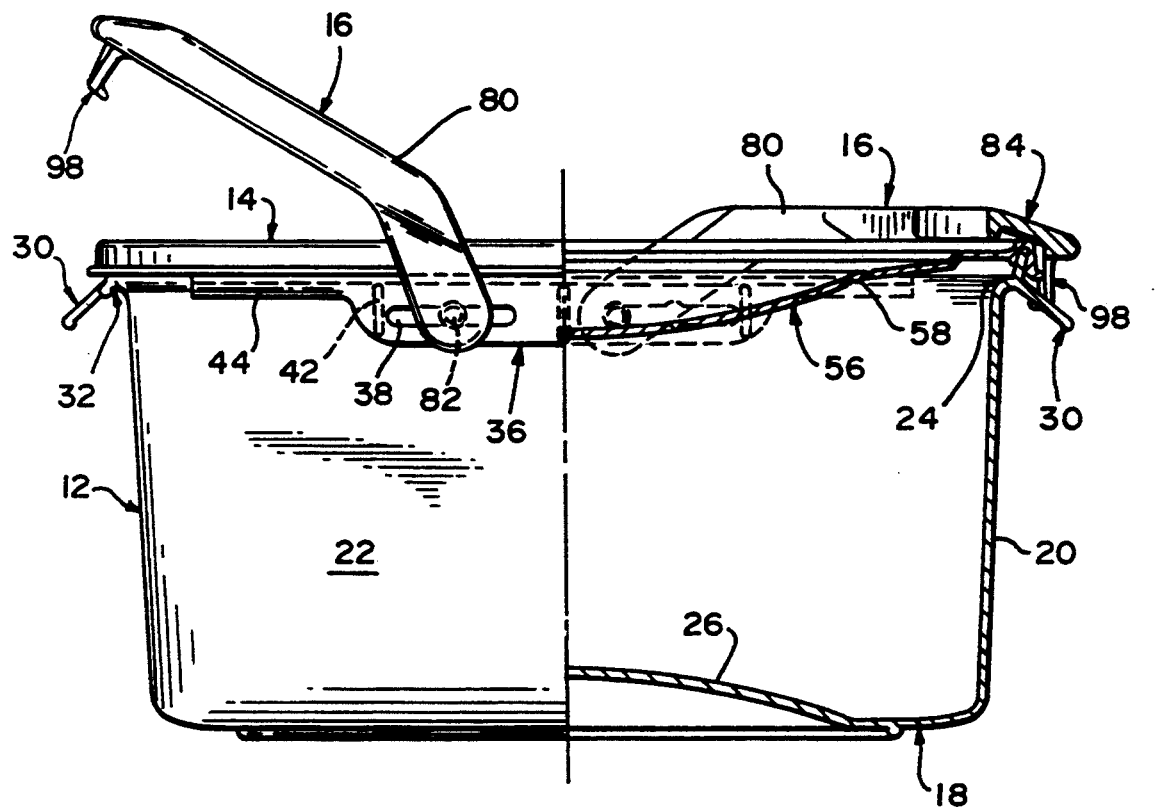
FIG_3
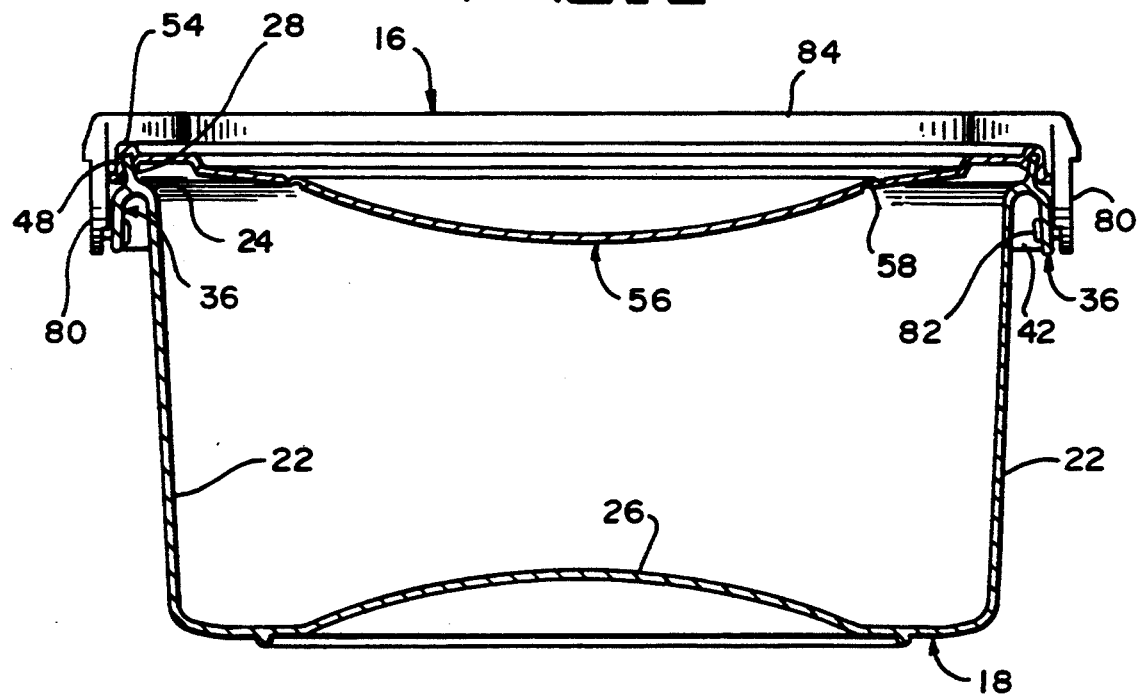
FIG_4

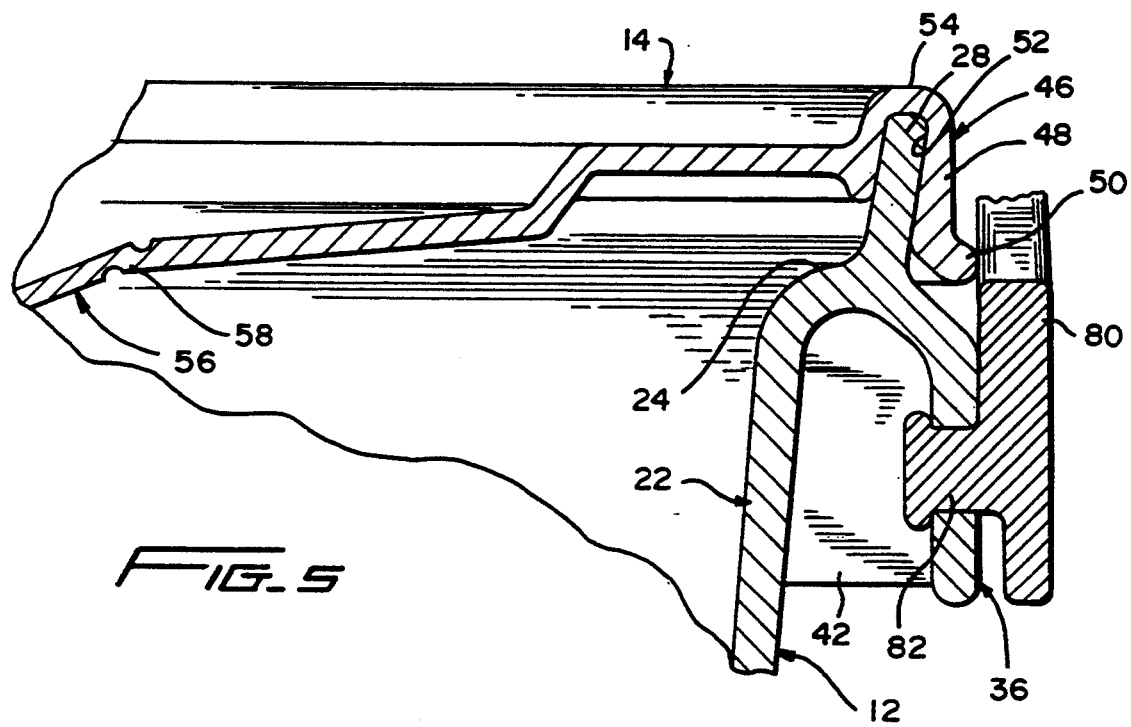
FIG_5
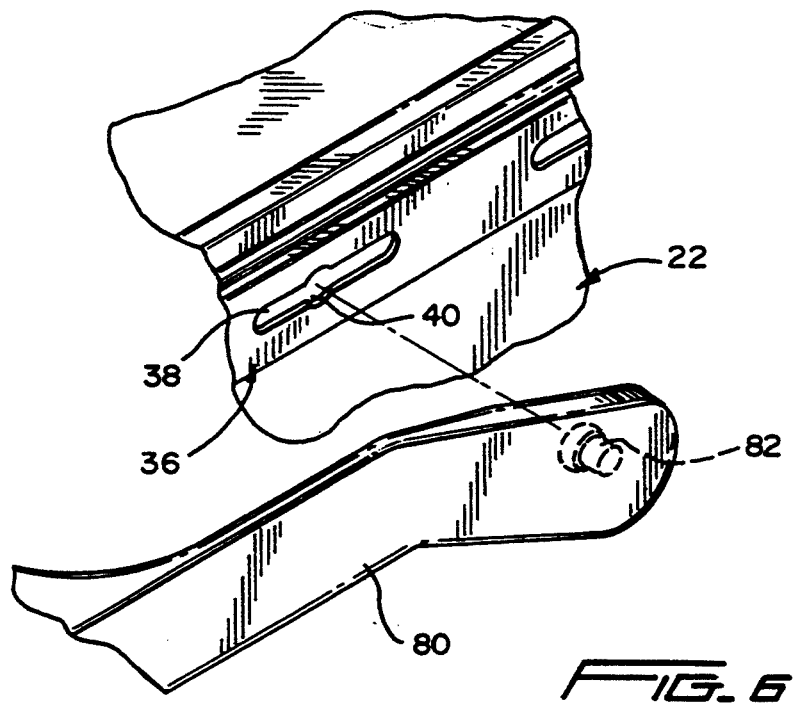
FIG_6

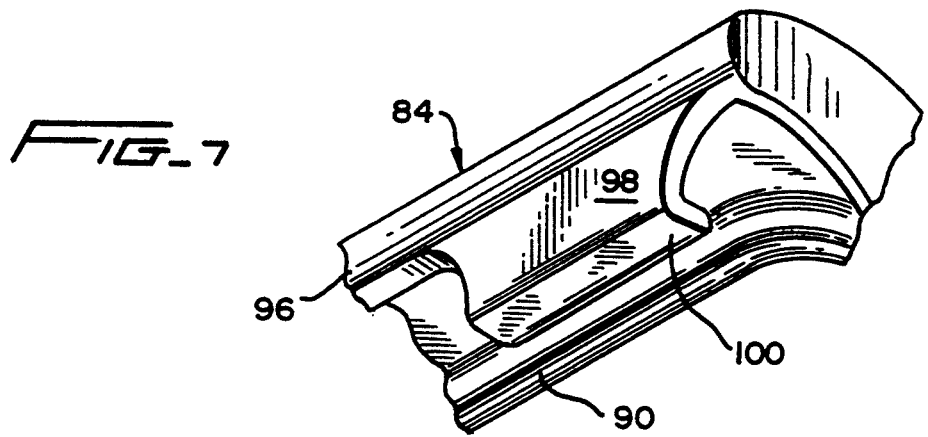
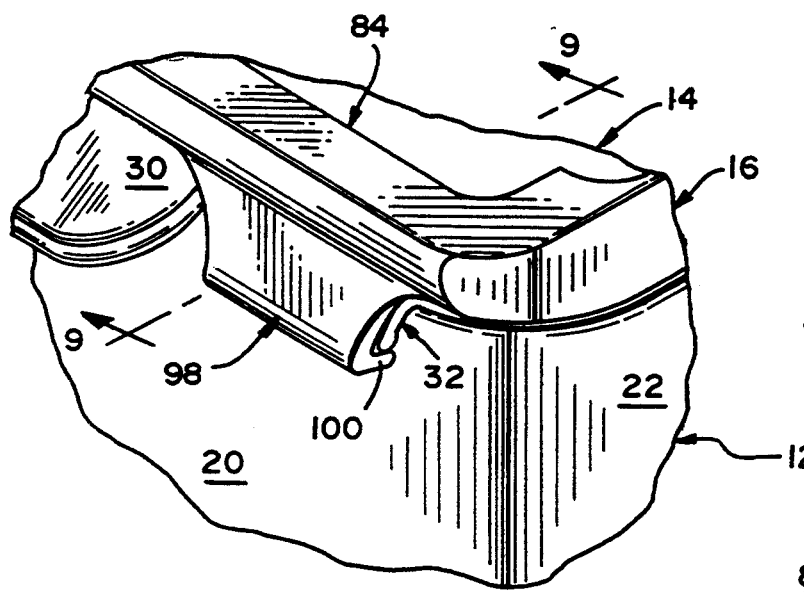
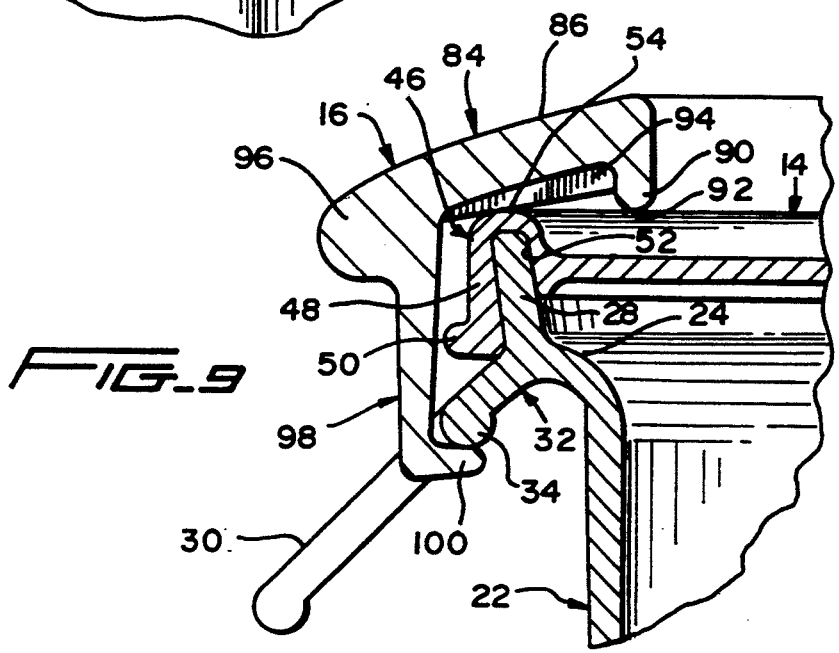

FOOD PROCESSING CONTAINER

BACKGROUND OF THE INVENTION

The present invention generally relates to food processing containers, and is particularly concerned with containers specifically adapted for preparation of kimchi, a national dish of Korea prepared as a "vegetable pickle" seasoned with garlic, red pepper and ginger.

Kimchi is prepared through a fermentation process, typically within large crockery pots with lids adapted to contain elevated pressures generated during the fermentation process.

The length of the fermentation process is normally approximately eight days. However, this is rather inexact and may vary in accord with the specific quantity and quality of the ingredients. Conventionally, at what is deemed to be an appropriate time, the lid of the pot is removed and the contents inspected. This of course releases the internal gases and the pressure generated thereby. With the conventional crockery pot, there is no good or accurate way to determine the progress of the fermentation process without an actual opening of the pot and a visual inspection of the contents. If, upon removal of the cover, it is found that the fermentation process has not in fact progressed to an acceptable point, it may be necessary to start the process all over again. By the same token, if the process has proceeded beyond an acceptable point, the resultant product itself may be unacceptable.

Thus, the preparation of kimchi using conventional means is a trial and error procedure at least until one reaches a degree of skill enabling proper preparation based on developed knowledge.

It is also to be appreciated that the gases generated during the fermentation process can be quite odiferous. As such, the instantaneous and total release thereof by a removal of the cover for a direct inspection of the contents of the pot can be unsettling, particularly to those new to the preparation of kimchi.

SUMMARY OF THE INVENTION

The purpose of the present invention is to provide a food processing container particularly adapted for the preparation of kimchi, with the container being equally adapted for use by both of those skilled in the art of kimchi preparation and those new to the preparation of kimchi.

Pursuant thereto, it is a significant object of the invention to provide a container wherein provision is made for a positive locking of the cover to the receptacle for a retention of the cover during the fermentation process and the internal generation of pressurizing gas. In conjunction therewith, it is also significant that the invention provide for a positive visual indication of the progress of the fermentation process without requiring an opening of the container or an otherwise visual inspection of the interior of the container. In this manner, premature or late termination of the fermentation process is substantially avoided.

Another object of the invention is the provision of means for a controlled venting of the odiferous gases prior to a complete removal of the cover, thus allowing, as an example, a venting of the gases from the container outside the house. After venting, the container, with the prepared kimchi, can be brought back into the house and the cover removed without being subjected to the odors normally experienced upon the opening of a kimchi container.

Other objects of the invention include the provision of a kimchi container wherein the components are economically formed, preferably molded of an appropriate synthetic resinous material, and capable of providing, when closed, a positive gas-tight seal. In conjunction therewith, it is significant that the container of the invention be easily closed and locked, and equally easily unlocked and opened.

The advantages derived from the container of the invention result from the structural uniqueness thereof and the nature of the features incorporated therein.

The container includes an upwardly opening receptacle, preferably rectangular with the peripheral walls including opposed parallel end walls and opposed parallel side walls. The closed bottom is rigidified by a permanent upward doming of the central portion thereof.

The upper edges of the walls, defining the upwardly directed mouth of the receptacle, are outwardly rolled and continuous about the container. An upwardly directed and slightly outwardly inclined sealing flange is integrally formed with the outwardly rolled upper edges and also extends continuously about the container.

A pair of fixed handles or hand grips are formed integral with the outwardly rolled upper edges of the opposed end walls centrally therealong. Relatively shorter locking lugs are similarly formed to the opposite sides of each hand grip.

A pair of elongate mounting flanges are integrally formed centrally along the outwardly rolled upper edges of the opposed side walls and depend substantially vertically in outwardly spaced relation to the corresponding side walls. Each of these mounting flanges includes a pair of aligned longitudinally extending elongate slots.

The receptacle is selectively sealed by an overlying cover which is of a rectangular configuration similar to that of the receptacle and includes a peripheral downwardly directed continuous sealing groove adapted to receive and seal to the sealing flange of the receptacle.

The cover includes an enlarged central domed panel peripherally engaged with the adjacent portion of the cover by an integral or living hinge with the domed portion initially being flexed inwardly toward the interior of the container, and response to generation of a predetermined internal gaseous pressure to outwardly invert and thus provide a visual indication of a pressurized interior.

The cover also includes a small port therethrough selectively closed by a manually openable plug-type closure for the controlled venting of interior pressure without requiring removal of the cover.

The container includes a pair of handles, generally in the nature of bails, with the opposed inner ends of the arms slidably and pivotally mounted within the elongate slots in the opposed mounting flanges. The outer ends of the arms of each handle include a cross bar with projecting clips adapted, upon a longitudinal inward shifting of the downwardly folded handles, to engage beneath the locking lugs on the receptacle end walls. When so engaged, the cross bars of the handle overlie and engage against the cover at at least selected points along the periphery thereof immediately above the sealing groove formed therein.

Release of the handle clips from the receptacle lugs, thereby freeing the cover for removal, is accomplished by a longitudinal outward shifting of the handles, permitted by the elongate handle mounting slots within the opposed mounting flanges. The handles, when released, can then be upwardly pivoted to engage centrally transversely across the container, thereby defining a single handle assembly for carrying the container.

Additional objects and advantages of the invention will become apparent from the more detailed description of the construction and manner of use of the container as hereinafter described and claimed.

BRIEF DESCRIPTION OF THE DRAWINGS

FIG. 1 is a perspective view of the food processing container with the handles pivoted to the carrying position;

FIG. 2 is a perspective view of the container with the handles in the locking position;

FIG. 3 is a longitudinal view of the container with a portion thereof in section and with the corresponding handle in its locked position;

FIG. 4 is a transverse cross-sectional view taken substantially on a plane passing along line 4—4 in FIG. 2;

FIG. 5 is an enlarged sectional detail taken substantially on a plane passing along line 5—5 in FIG. 2;

FIG. 6 is an exploded perspective detail of the slide and pivot mounting of one arm of one of the handles;

FIG. 7 is a perspective detail of one of the locking clips on a handle crossbar;

FIG. 8 is a perspective detail illustrating a handle clip in locking engagement with a receptacle lug;

FIG. 9 is an enlarged cross-sectional detail taken substantially on a plane passing along 9—9 in FIG. 8;

DESCRIPTION OF THE PREFERRED EMBODIMENTS

Figure 10:
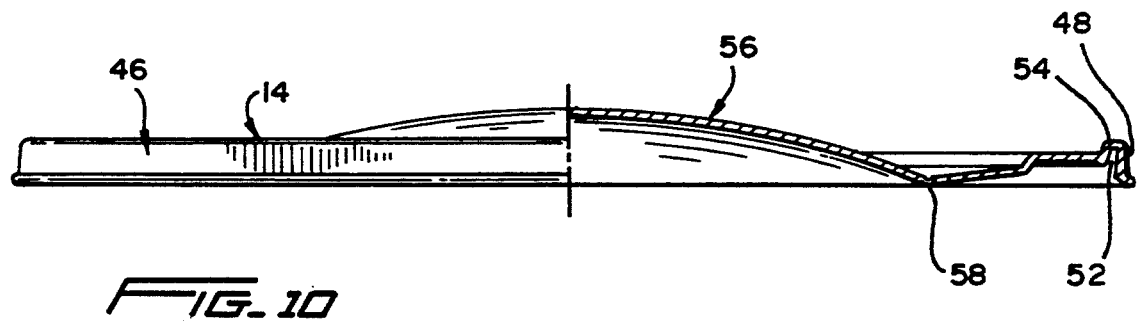
FIG. 10 is an elevational view, partially in section, of the container cover.
Figure 11:
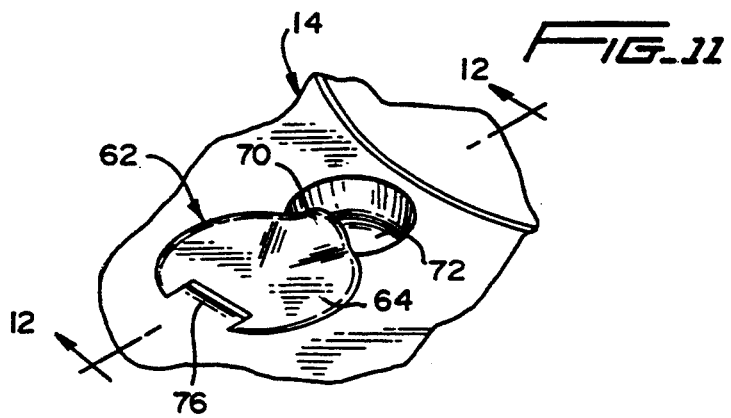
FIG. 11 is a perspective detail of the cover at the venting port.

Referring now more specifically to the drawings, the food processing kimchi container 10 basically comprises an upwardly opening receptacle 12, a cover 14 and a pair of multipurpose retaining handles 16. All of these components are preferably molded of an appropriate synthetic resinous material.

The receptacle 12, while not specifically limited thereto, is preferably rectangular as illustrated and includes a bottom 18, opposed end walls 20, and opposed side walls 22 which may be of equal or greater width relative to the end walls 20. The walls 20 and 22 are integrally formed with the bottom 18 and extend upwardly therefrom to terminate in an outwardly rolled upper edge portion 24 extending continuously about the upper periphery of the receptacle 12 and defining the receptacle mouth.

Inasmuch as the container 10 will, as a result of the fermentation process, be internally pressurized, it is preferred that the enlarged generally planar bottom 18 be rigidified by the provision of a central permanently upwardly domed portion 26 therein.

The continuous outwardly rolled upper edge portion 24 of the peripheral walls has an integral upwardly and outwardly inclined sealing flange 28 coextensive therewith.

A pair of hand grips or handles 30 are integrally formed with the outwardly rolled upper edge portion 24 centrally of each of the opposed end walls 20. The hand grips 30 extend outwardly and downwardly, and terminate in a bulbous lower edge to provide for a ready grasping and handling of the container.

A locking lug 32 is integrally formed with the outwardly rolled upper edge portion 24 to each side of each of the hand grips 30 and is both slightly spaced therefrom and substantially coplanar therewith so as to extend outwardly and downwardly relative to the upper edge portion 24. Each of the locking lugs 32, a pair thereof being associated with each end wall 20, is substantially shorter than the hand grip 30 therebetween, and terminates in a slightly bulbous outer edge 34. As will be recognized from the drawings, both the hand grips 30 and the elongate locking lugs 32 are formed outward of the upwardly directed sealing flange 28.

A pair of elongate mounting flanges 36, one positioned centrally along each of the opposed side walls 22, are integrally formed with the outwardly rolled upper edge portion 24 and depend downwardly in outwardly spaced generally parallel relationship to tile associated side wall 22. Each mounting flange 36 includes a pair of aligned elongate slots 38 therein. Each of the slots 38 has a centrally located enlarged opening 40 between the opposed end portions of the slot. The mounting flanges 36 may be rigidified by a plurality of spaced gussets 42 integral with and extending between each mounting flange and the adjoining side wall 22. As desired, and for additional stability, the outwardly rolled edge portion 24, beyond each of the opposed ends of each mounting flange 36, can include an integral outwardly and downwardly directed rigidifying length 44 which in cross-section is generally similar to the locking lugs 32.

The cover 14, is configured to overlie and close the open upper end or mouth of the receptacle 12, and hence in the illustrated embodiment is rectangular. The cover includes a continuous peripheral edge portion 46 with a depending outer skirt 48 terminating in a lower enlarged or bulbous gripping edge portion 50. The peripheral edge portion 46, immediately inward of the skirt 48, is configured to define a continuous downwardly opening sealing groove 52, the configuration of which is such as to intimately and sealingly receive the sealing flange 28. The inherent flexible resiliency of the material of the cover can be used to insure the desired sealed engagement.

As will be noted from the drawings, the peripheral edge portion 46 of the cover 14, within which the sealing groove 52 is defined, is upwardly offset from the general plane of the cover to define a peripheral rim 54 about the cover.

The cover 14, in addition to its function of sealing the container, incorporates structure to perform two additional significant functions, a visual indication of internal pressure conditions, and a means for venting the interior of the container.

In order to provide a visual means for indicating internal pressure conditions, the major central portion of the cover 14 is formed in a concavo-convex configuration and comprises a central disc 56 peripherally joined with the surrounding portion of the cover by an integral living hinge structure 58 which allows for a flexing of the disc 56 between an inwardly directed convex position, as in FIGS. 3 and 4 wherein there is little pressure differential between the interior and exterior of the container, and a second outwardly convex position, as in FIGS. 2 and 10, which will result from a predetermined buildup of internal pressure from the fermentation process. The nature of the living hinge and the specific configuration of the flexing disc 56 are such whereby full movement of the disc 56 to its outer or pressure-extended position occurs when the internal generated pressure is consistent with arrival at the desired fermentation level, thereby providing a ready visual indication of the completion of the fermentation without requiring an opening of the container or an exposure of the contents.

Figure 12:
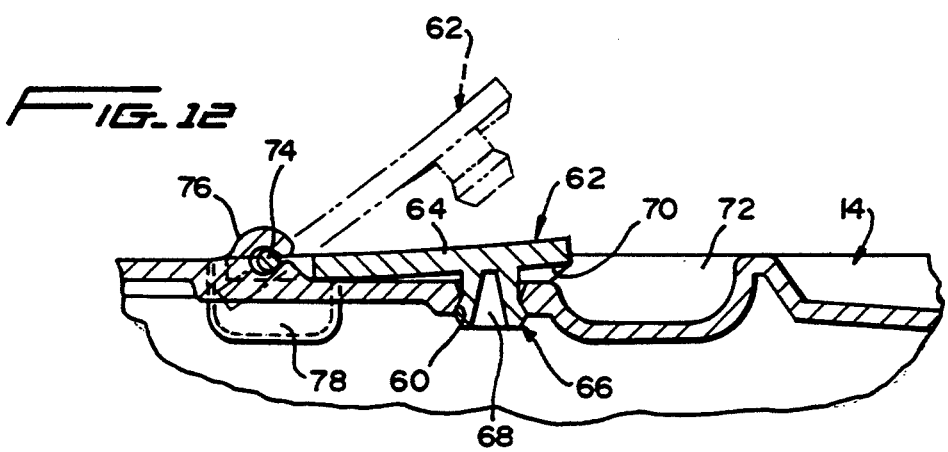
FIG. 12 is an enlarged cross-sectional detail through the venting port taken substantially on a plane passing along 12—12 in FIG. 11.

The cover 14, at a point therein outwardly spaced from the central disc 56, includes a pressure-venting port 60 therethrough. A closure 62 associated with the port 60 includes a handling flap 64 with a depending plug 66 which frictionally engages within and seals the port 60. The plug 66, as illustrated, may have a peripherally enlarged leading end to effect a positive snap lock within the port 60. Also, the plug is preferably provided with a central downwardly opening conical recess 68 whereby internal pressure generated within the container will also act within the recess and tend to laterally outwardly bias the plug for enhanced sealing engagement within the port 60. The rigid flap 64 includes a slightly upwardly bowed edge portion immediately adjacent the plug 66 which defines a finger grip 70. The cover 14 immediately outward of the finger grip 70 has a recess 72 defined therein to allow ready access to the finger grip 70 for an upward pivoting of the closure 62 to disengage the plug 66 from the port 60. The flap 64, diametrically opposed from the finger grip 72, is hinged to the cover 14 by a transverse pin 74 engaged through aligned knuckles 76 formed from the closure flap 64 and the top panel of the cover. As will be noted in FIG. 12 in particular, a closed chamber 78 is provided immediately below the hinged joinder of the closure 62 to the top panel of the cover 14 to accommodate pivotal movement of the closure flap 64 to its open position, and to allow formation of the hinge assembly without perforation of the cover.

Turning now to the handles ]6, the handles 16 function alternately as a means for locking the cover 14 to the receptacle 12 during the fermentation process, and as a carrying means for the container upon release from their locking position.

Each handle 16 includes a pair of opposed arms 80 positioned to the opposite sides of the container 12 and mounting inwardly directed pivot pins 82 engaged within a pair of opposed slots 38 within the mounting flange 36. Noting FIGS. 5 and 6 in particular, each pivot pin includes an enlarged head on the outer end thereof which passes freely through the enlarged central opening 40 of the slot but which, upon longitudinal shifting of the pin 82 within the slot 38, precludes lateral withdrawal from the slot. As will be appreciated, actual engagement and disengagement of the pins 82 from the slots 38 will require a slight outward flexing of the arms 80 of the handles 16.

The outer ends of the arms 80 of each handle 16 are integrally interconnected by a crossbar 84 in the nature of a retention or retainer member for the cover as will be apparent subsequently.

The retaining bar 84 of each handle 16, in the downwardly swung position thereof as in FIGS. 2 and 9 in particular, includes a top panel 86 which overlies the peripheral rim 54 of the cover ]4 and which is relatively wider at and extends generally diagonally across the corners defined between the bar 84 and associated arms 80 as generally indicated at reference numeral 88. The inner edge of the top panel 86 includes a depending pressure flange 90 which, across the corresponding end of the receptacle, is inwardly spaced from the cover rim 54, but which, at the generally diagonal corners, overlies and engages against the cover rim. This feature will be noted at 92 in FIGS. 2 and 9.

Noting FIGS. 1 and 9, each of the retainer bars 84 also includes a pair of spaced transverse pressure ribs 94 integral with the top panel 86 and extending outward from the pressure flange 90 to an outer bulbous portion 96 defining the outer periphery of the top panel 86 of the handle 16. The pressure ribs 94 are of a depth so as to overlie and engage on the cover rim 54 centrally along the end wall portion thereof simultaneously with engagement of the corner portions of the associated pressure rib 90 with the cover rim at points 92 located on the side wall portions of the cover in close proximity to the associated end wall portion.

Each of the handles ]6 additionally includes a pair of integral depending locking clips 98 aligned with the corresponding end wall locking lugs 32 and longitudinally spaced along the crossbar 84 so as to pass to the opposite sides of the receptacle hand grip 30. Each of the locking clips 98 includes a laterally inwardly directed bottom flange 100 adapted to slidably engage, with a positive friction fit, beneath the bulbous lower edge 34 of the corresponding locking lug 32 upon an inward sliding of the crossbar 84, accommodated by the sliding movement of the pivot pins 82 within the corresponding elongate slots 38 at the inner ends of the corresponding handle arms 80.

Inasmuch as the crossbars 84 are to effect a positive retention of the cover 14 on the receptacle 12, it will be appreciated that the relative dimensions are such whereby a downward force is exerted on the cover 14 by pressure flanges 90 at pressure points 92, and by pressure ribs 94 upon a lateral inward movement or shifting of the handle crossbars 84 to engage the bottom clip flanges 100 beneath the bulbous edges 34 of the locking lugs 32 as best seen in FIGS. 8 and 9.

As will be noted in the drawings, in order to provide for a generally parallel positioning of each crossbar 84 over and relative to the cover in the locking position thereof, the corresponding mounting arms 80 have the inner portions thereof angled downwardly to position the corresponding pivot pins 82 below the cover 14 and in alignment with the pin-receiving slots 38 in the depending side flanges 36.

The length of the slots 38 is such whereby when it is desired to release the clamping pressure on the cover 14, the opposed handles ]6 are merely horizontally outwardly shifted, the pivot pins 82 moving easily along the corresponding slots 38. Once the locking clips 98 are clear of the locking lugs 32, the arms are pivoted upward into the carrying position of FIG. 1. This completely exposes the cover 14 and allows for removal thereof by engaging the lower edge portions 50 of the cover skirt 48 for an upward peeling of the cover.

As will be noted from FIG. 1, with the handles 16 in the carrying position, the longitudinal spacing of the locking clips 98 is such as to provide a hand grip area therebetween. In the cover locking position of FIG. 2, the hand grips 30 extend substantially outward beyond the locking clips 98 for ready access thereto to allow for a carrying of the closed and sealed container.

In use, for example in preparation of kimchi, the appropriate ingredients are placed within the receptacle 12. Next, the cover 14, with the central panel 56 depressed, is sealed to the receptacle by frictional engagement of the receptacle sealing flange 28 within the peripheral sealing groove 52 of the cover 14. The two handles 16 are then swung outwardly and downwardly to a generally horizontal position with the locking clips 98 in outward alignment with the locking lugs 32. The handles 16 are then shifted laterally inward to frictionally engage the lower flanges 100 of the clips 98 with and immediately below the locking lugs 32. So positioned, the pressure flanges 90 and pressure ribs 94 are retained in downward clamping engagement against the rim 54 of the cover. The container is then set aside and the fermentation process takes place.

Ultimately, the fermentation process will create enough pressure within the container to cause the central indicator disc 56 to bulge or dome outwardly, flexing about the peripheral living hinge 58. It is contemplated that this will occur approximately eight days after initiation of the fermentation process, and will provide a positive visual indication that the fermentation process is complete or at least has reached a substantially complete stage.

The container, preferably after removal from the house because of the odiferous nature of the gases, is vented through the venting port 60 by upwardly flipping the closure 62 to disengage the plug 66 from the port. After the gases have been vented from the container, the cover can be safely removed and the contents inspected. If, as is normally the case, the fermentation process is completed, nothing further need be done. Should it be decided that more "pickling" is necessary or desired, the central indicator disc 56 of the cover can be downwardly inverted, and the container resealed.

The foregoing is considered illustrative of the principles of the invention, and as other embodiments and modifications may occur to those skilled in the art, it is not desired to limit the invention to the exact construction shown and described. Rather, the invention is only to be limited by the scope of the claims following hereinafter.

We claim:

1. A food processing container comprising an upwardly opening receptacle and a cover removably mounted in overlying and sealing relation to said receptacle; said receptacle including peripheral wall means with peripheral upper rim means defining an open top to said receptacle, and a closed bottom; said cover including peripheral seal means coextensive and engageable with said receptacle rim means for sealing said cover to said receptacle, said cover including an indicator portion formed therein and movable in response to a pressure increase within said receptacle when sealed by said cover; and retainer means mounted to said receptacle and movable relative thereto between a first position engaging and clamping said cover against said receptacle and a second position released from said cover to allow removal of said cover from said receptacle, said retainer means including a pair of spaced retainer bars overlying opposed peripheral portions of said cover, each bar mounting at least one depending locking clip, said receptacle wall means having locking lugs thereon one aligned with each of said clips, and means mounting each retainer bar for movement between said first position wherein said clip thereon is engaged with the associated lug to preclude upward movement of said cover relative to said receptacle, and said second position wherein said clip thereon is offset from the associated lug to allow upward movement of said cover relative to said receptacle.

2. The container of claim 1 wherein said means mounting each retainer bar comprises a pair of laterally spaced arms fixed to sand extending from the retainer bar and terminating in inner ends slidably and pivotally engaged with said receptacle wall means on an axis spaced from and parallel to the retainer bar for pivotal movement of the retainer bar.

3. The container of claim 2 wherein said peripheral wall means of said receptacle includes opposed end walls and opposed side walls, said locking lugs projecting from said end walls, said means mounting each retainer bar further including a pair of mounting flanges, one integral with each side wall in outwardly spaced generally parallel relation thereto, each mounting flange having a pair of spaced aligned slots defined therein, said pair of spaced arms of each retainer bar having the inner ends thereof aligned with a pair of corresponding ones of said slots, one in each mounting flange, and a pivot pin fixed to each arm inner end and both slidably and pivotally retained in the aligned slot, whereby each said retainer bar and associated arms is pivoted upward to position the bar spaced above and transversely across the receptacle and cover, and pivoted downward to engage said bar on said cover, and each retainer bar, with the associated arms, is, when engaged on said cover, slidable to selectively engage and release said clips with said locking lugs.

4. The container of claim 3 wherein a pair of locking lugs extend from each end wall at laterally spaced points thereon.

5. The container of claim 2 wherein said indicator portion of said cover is selectively movable between a first position inwardly extending relative to said receptacle and indicating the absence of any substantial gaseous pressure increase in said container, and a second position outwardly projecting relative to said receptacle and indicating a predetermined gaseous pressure increase in said container.

6. The container of claim 5 wherein said indicator portion is of a concavo-convex configuration with an integral living hinge peripherally joining said portion to the surrounding portion of said cover.

7. The container of claim 6 wherein said indicator portion is at rest in each of said first and second positions thereof, and is manually returnable from said second position to said first position upon release of increased gaseous pressure thereon.

8. The container of claim 7 wherein said cover further includes a pressure release port therethrough, and manually releasable closure means for selectively opening said port.

9. The container of claim 8 wherein said rim means comprises a continuous upper edge portion on said wall means, an upwardly directed sealing flange coextensive with said upper edge portion, said locking lugs being integral with said wall means adjacent said upper edge portion and below said sealing flange, said lugs projecting downwardly and outwardly relative to said upper edge portion.

10. The container of claim 9 wherein each locking clip includes a laterally turned lower end portion engageable below and upwardly against the associated locking lug, said lower end portion being positioned relative to the associated retainer bar whereby this bar engages over and downwardly against the mounted cover simultaneously with engagement of the lower end portion against the associated locking lug for a clamping of said cover to said receptacle.

11. The container of claim 10 including a pair of hand grips integral with and projecting outward of opposed areas of said wall means adjacent said upper edge portion.

12. The container of claim 11 wherein said peripheral wall means of said receptacle includes opposed end walls and opposed side walls, said locking lugs projecting from said end walls, said means mounting each retainer bar further including a pair of mounting flanges, one integral with each side wall in outwardly spaced generally parallel relation thereto, each mounting flange having a pair of spaced aligned slots defined therein, said pair of spaced arms of each retainer bar having the inner ends thereof aligned with a pair of corresponding ones of said slots, one in each mounting flange, and a pivot pin fixed to each arm inner end and both slidably and pivotally retained in the aligned slot, whereby each said retainer bar and associated arms is pivoted upward to position the bar spaced above and transversely across the receptacle and cover, and pivoted downward to engage said bar on said cover, and each retainer bar, with the associated arms, is, when engaged on said cover, slidable to selectively engage and release said clips with said locking lugs.

13. The container of claim 12 wherein a pair of locking lugs extend from each end wall at laterally spaced points thereon, one of said hand grips extending from each end wall between the corresponding locking lugs.

14. The container of claim 1 wherein said rim means comprises a continuous upper edge portion on said wall means, an upwardly directed sealing flange coextensive with said upper edge portion, said locking lugs being integral with said wall means adjacent said upper edge portion and below said sealing flange, said lugs projecting downwardly and outwardly relative to said upper edge portion.

15. The container of claim 14 wherein each locking clip includes a laterally turned lower end portion engageable below and upwardly against the associated locking lug, said lower end portion being positioned relative to the associated retainer bar whereby this bar engages over and downwardly against the mounted cover simultaneously with engagement of the lower end portion against the associated locking lug for a clamping of said cover to said receptacle.

* * * * *